United States Patent [19]

Hopkins

[11] Patent Number: 5,765,543
[45] Date of Patent: Jun. 16, 1998

[54] SIDEBURNER FOR BARBECUE GRILL CARTS AND THE LIKE

[75] Inventor: William Ladon Hopkins, Columbus, Ga.

[73] Assignee: W.C. Bradley Company, Columbus, Ga.

[21] Appl. No.: 290,686

[22] Filed: Aug. 12, 1994

[51] Int. Cl.[6] ........................................ F23C 3/00
[52] U.S. Cl. ..................... 126/50; 126/39 B; 126/25 R; 126/41 R; 126/39 E
[58] Field of Search ....................... 126/50, 41 R, 126/39 B, 39 R, 39 H, 39 N, 39 E, 214 A, 214 R

[56] References Cited

U.S. PATENT DOCUMENTS

| | | | |
|---|---|---|---|
| 954,428 | 4/1910 | Frost | 126/39 R |
| 2,611,358 | 9/1952 | Taylor | 126/214 R |
| 2,939,453 | 6/1960 | Kamin | 126/214 A |
| 3,059,632 | 10/1962 | Rogers | 126/214 R |
| 3,166,064 | 1/1965 | Waltman | 126/39 H |
| 3,724,441 | 4/1973 | Finley | 126/214 R |
| 4,750,470 | 6/1988 | Beach et al. | 126/39 R |
| 4,781,170 | 11/1988 | Perl | 126/41 R |
| 5,203,317 | 4/1993 | James | 126/50 |

*Primary Examiner*—Carl D. Price
*Attorney, Agent, or Firm*—Thomas, Kayden, Horstemeyer & Risley; James W. Kayden

[57] ABSTRACT

A sideburner assembly attaches to the legs of a barbecue grill and has a substantially flat top surface. The sideburner assembly has a base plate onto which a gas valve, a control knob, and a burner element are mounted. The burner element is mounted in a recessed portion of the base plate and is separated from the gas valve and control knob by a heat shield. The sideburner assembly also comprises a cover plate that has an opening for a cooking grate and an opening for the control knob. The cover plate and the openings in the cover plate are sized so that the top of the control knob and the top of the cooling grate are flush with the top surface of the cover plate.

13 Claims, 2 Drawing Sheets

SIDEBURNER FOR BARBECUE GRILL CARTS AND THE LIKE

FIELD OF THE INVENTION

BACKGROUND OF THE INVENTION

Most of the barbecue grills manufactured today are designed to be mounted on a wheeled cart or on a fixed stand. Along with the means used to support the grill itself, it is common for the carts or stands to include shelves mounted on one or both sides of the grill and in many cases in front of the grill. These shelves can be used to hold food, cooking utensils, condiments, and other accessories utilized in outdoor barbecuing. In response to consumer demands, it has also become common for barbecue grill manufacturers to supply an auxiliary sideburner. Such a sideburner normally replaces one of the shelves on the right or left side of the barbecue grill. An alternative method is shown by U.S. Pat. No. 5,203,317 for an auxiliary burner. This burner is mounted on top of the side shelf to enable the user to retrofit an existing barbecue grill with a sideburner assembly. The above-referenced patent is commonly owned with the present application.

Such sideburners have many uses, for example they can be used to heat a pot of coffee, a pot of soup or baked beans, or any other item which cannot be cooked or heated on the barbecue grill due to limitations on the height of the food, pan, etc. which can be used beneath the closed grill hood which covers the cooking area.

While convenient for some uses, the sideburner normally reduces shelf space around the barbecue grill, which space is normally at a premium. While the burner sometimes are outfitted with a cover upon which small items can be placed, the cover is normally raised above the remainder of the burner unit, thus at least further limiting shelf space around the barbecue grill. It is the solving of this problem to which the present invention is directed, as well as the provision of a uniquely designed sideburner which provides all of the advantages of such cooking units without the attendant disadvantages of certain prior art models.

SUMMARY OF THE INVENTION

It is therefore, one of the principal objects of the present invention to provide a sideburner assembly for mounting in place of a shelf on a barbecue grill cart or the like which provides a shelf-like surface that is close to or substantially flush throughout the upper surface thereof.

Another object of the present invention is to provide a sideburner which can be used either as a sideburner or as a shelf for holding food, cooking utensils, and other items used in barbecuing.

A further object of the present invention is to provide a sideburner assembly that is easily cleaned and which operates with greater thermal efficiency than most prior art designs heretofore produced.

A still further object of the present invention is to provide a sideburner designed to be mounted on a barbecue grill cart, stand, or the like, which can be economically produced, easily installed, and is durable to provide a long service life.

These and other objects are attained by the present invention in which a base unit is provided for mounting on the spaced legs of the barbecue grill cart or like mounting. The base unit includes a burner pan or well which houses the gas burner. A cover means is disposed over the base pan and provides an essentially planar upper surface useable as a shelf when the burner is not being utilized. The cover means accepts a cooking grid disposed above a burner unit and also the gas controls which operate the burner. While designed primarily for mounting on a grill cart, it is further conceivable that the present burner could be mounted on any suitable support surface, such as, for example, a shelf or housing near a barbecue pit.

Various additional objects and advantages of the present invention will become apparent from the following detailed description, read in conjunction with the accompanying drawings.

DETAILED DESCRIPTION OF THE PREFERRED EMBODIMENT

Figure 1:
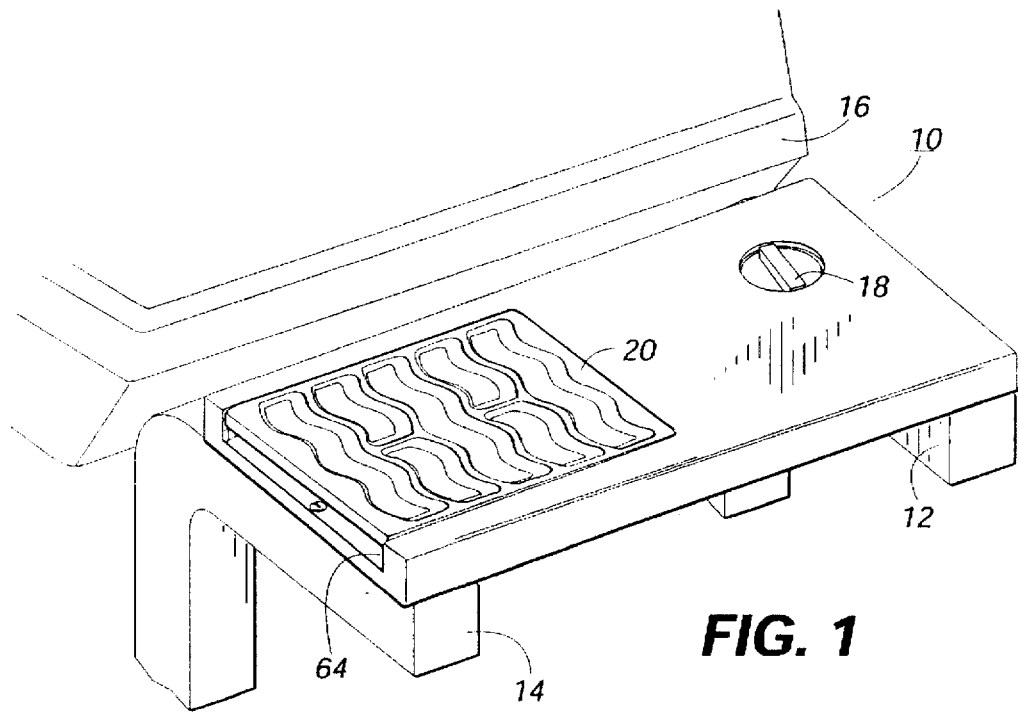
FIG. 1 is a perspective view of the present sideburner shown mounted on the legs of a barbecue grill cart.

Referring now more specifically to the drawings, and to FIG. 1 in particular, numeral 10 designates generally a first embodiment of the present sideburner assembly. The sideburner is typically mounted on the legs of a barbecue grill cart as represented here by legs 12 and 14. As shown in FIG. 1, the mounting is adjacent the barbecue grill 16 such that it is conveniently located for use as an auxiliary cooking means.

The sideburner assembly is constructed from steel, aluminum, or other heat resistant material. A significant advantage of the invention is the recessed control 18 and the recessed or inset grate 20. This arrangement allows the sideburner to be used as a shelf when it is not being used for cooking.

Figure 2:
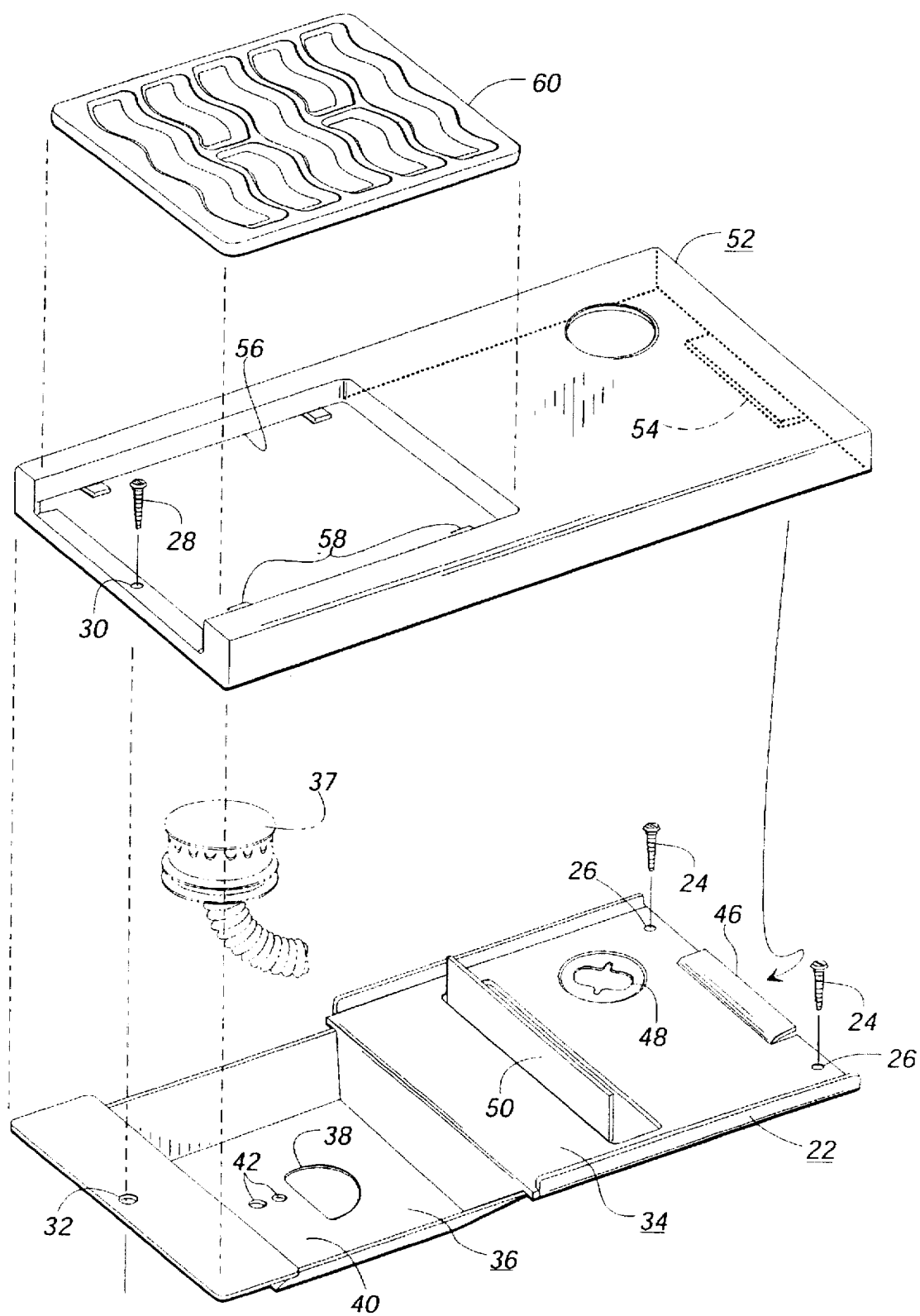
FIG. 2 is an exploded perspective view of the present sideburner shown apart from its mounted position.

Referring now to FIG. 2, the sideburner assembly includes a base plate 22 which is secured to cart leg 12 with fasteners 24 that are disposed through apertures 26. These apertures 26 are spaced so as to hold the base plate 22 to the cart legs and are in alignment with the holes that are normally placed in the legs for mounting a conventional side shelf thereon. Thus, the sideburner may be provided by the manufacturer when the grill is purchased, or it can be sold separately and added to a grill after removing the conventional side shelf supplied by the manufacturer. The opposite end of the sideburner is secured to the cart leg 14 with fastener 28 that is disposed through hole 30 in the cover plate 52, hole 32 in the base plate 22, and then into the cart leg.

The base plate 22 includes a generally flat portion 34 and a well portion 36 within which the burner element 37 is mounted. The burner element extends through the "D" shaped aperture 38 which is formed in the floor 40 of pan 36. Floor 40 also includes mounting holes 42 for mounting a conventional piezoelectric igniter (not shown) for lighting the burner element. Adjacent the pan or well portion 36 of the base plate 22 is the generally rectangular plate member 34. This member includes a clip 46 at one end thereof disposed between apertures 26. This clip 46 receives a corresponding clip 54 from the burner cover plate 52 as will be discussed in detail hereinbelow. Also located in plate 34 is an aperture 48 through which is mounted the gas valve 68 that supplies gas to the burner element for the side burner.

In order to deflect heat from the burner element away from the gas valve and the control knob 18, an upstanding heat deflector shield 50 is provided, normally by punching out a generally rectangular section from the plate 34 and bending the shield upwardly to a position that is substantially at a right angle to plate 34.

Disposed over the base plate 22 is a cover plate 52. The cover 52 has a clip means 54 on one end thereof which mates with clip 46 of the baseplate, thereby securing the cover 52 to the base plate 22 at this end without the use of any additional fastening means. When the clip means 54 is properly mated with clip 46, and aperture 66 in the cover 52 is aligned over aperture 48 in plate member 34. The opposite end of the cover plate 52 is secured using fastener 28 which is disposed through aperture 30 and aperture 32 after the clips 54 and 46 have been mated and secured.

At the other end of the cover 52 is a recessed opening 56 which is disposed over the pan 36 of the base plate 22. Tab members 58 or the like are located around the periphery of the opening 56 in order to support the cooking grate 60 in a position flush with the upper surface 62 of cover 52 as shown in FIGS. 1 and 2. The end portion 64 of the cover means or plate is left open, such that heat generated during the cooking process can escape. The cooking grate 60 rests on tabs 58, such that the upper surfaces thereof is substantially flush with the remainder of the surface 62.

Figure 3:
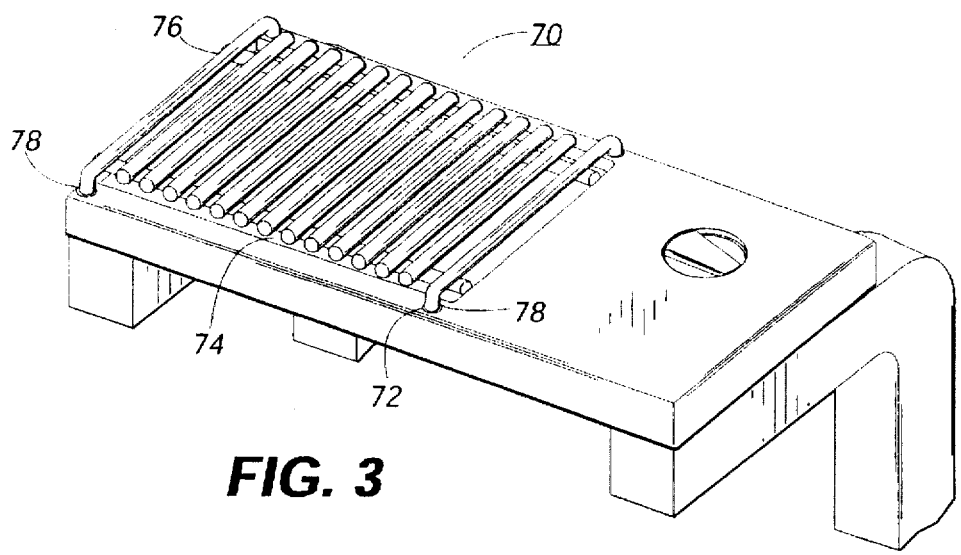
FIG. 3 is a perspective view of an alternate embodiment of the present sideburner shown mounted on the legs of a barbecue grill cart.

An alternate embodiment 70 of the present invention is illustrated in FIG. 3. In this embodiment, the cover plate is provided with apertures 72 in the upper surface thereof around the opening 74. A cooking grate 76 is disposed over opening 74. The cooking grate has legs 78 that extend downwardly therefrom for mating with apertures 72. This arrangement provides the same cooking performance as the first described embodiment but with a slightly raised cooking grate. Thus, this embodiment may still be used as an auxiliary shelf with the grate in place or with the grate simply lifted out of its mounting and stored.

While an embodiment of a sideburner for barbecue grill carts and the like and modifications thereof have been shown and described in detail herein, various additional changes and modifications may be made without departing from the scope of the present invention.

I claim:

1. A sideburner for use on a barbecue grill, comprising:
   a base plate having a substantially flat portion and a recessed portion and including a first aperture, said recessed portion for receiving a burner element;
   means for controlling the flow of gas to said burner element;
   means for mounting said base plate to said barbecue grill;
   a substantially flat cover plate having an opening for receiving a cooking grate, and including a second aperture; and
   means for attaching said cover plate to said base plate such that said opening is aligned with said recessed portion and such that said first aperture in said base plate is aligned with said second aperture for receiving means for controlling the flow of gas to said burner element;
   wherein said cover plate and said opening in said cover plate are sized so that a top surface of said cooking grate is flush with a top surface of said cover plate; and said base plate further comprises a heat shield located on said flat portion for separating said means for controlling the flow of gas from said recessed portion and for deflecting heat radiated from said burner element away from said means for controlling the flow of gas.

2. The sideburner as set forth in claim 1, wherein said means for controlling the flow of gas comprises:
   a gas valve and a control knob mounted to said first aperture in said base plate; and
   wherein a top of said control knob is flush with said top surface of said cover plate.

3. The sideburner as set forth in claim 1, wherein said means for mounting said base plate to said barbecue grill is for mounting said base plate to legs of said barbecue grill.

4. The sideburner as set forth in claim 1, wherein said means for attaching said cover plate comprises a first clip on an edge of said cover plate for mating with a second clip on a corresponding edge of said base plate.

5. A sideburner for use on a barbecue grill, comprising:
   a base plate having a recessed portion receiving a burner element, a gas valve, and a control knob mounted thereon;
   means for mounting said base plate to said barbecue grill;
   a substantially flat cover plate having an opening for receiving a cooking grate; and
   means for attaching said cover plate to said base play such that said opening is aligned with said recessed portion;
   wherein said base plate further comprises a heat shield for separating said control knob and said gas valve from said burner element and for deflecting heat radiated from said burner element away from said control knob and said gas valve.

6. The sideburner as set forth in claim 5, wherein said heat shield comprises a punched out portion of said base plate bent to form a vertical wall.

7. The sideburner as set forth in claim 5, wherein said base plate comprises a recessed portion for receiving said burner element, said recessed portion, said cover plate, and said opening in said cover plate are sized so that a top surface of said cooking grate is flush with a top surface of said cover plate.

8. The sideburner as set forth in claim 5, wherein said means for mounting said base plate to said barbecue grill is for mounting said base plate to legs of said barbecue grill.

9. The sideburner as set forth in claim 5, wherein said means for attaching said cover plate comprises a first clip on an edge of said cover plate for mating with a second clip on a corresponding edge of said base plate.

10. A sideburner for use on a barbecue grill, comprising:
    a base plate having a substantially flat portion and a recessed portion, said recessed portion for receiving a burner element;
    means for mounting said base plate to said barbecue grill;
    a substantially flat cover plate having an opening aligned with said recessed portion for receiving a cooking grate; and
    means for attaching said cover plate to said base plate;
    wherein said cover plate and said opening in said cover plate are sized so that a top surface of said cooking grate is flush with a top surface of said cover plate;
    a gas valve and a control knob mounted to said flat portion of said base plate for controlling the flow of gas to said burner element; and
    wherein said base plate further comprises a heat shield located on said flat portion for separating said control knob and said gas valve from said recessed portion and for deflecting heat radiated from said burner element away from said control knob and said gas valve.

11. The sideburner as set forth in claim 10, wherein said heat shield comprises a punched out portion of said base plate bent to form a vertical wall.

12. The sideburner as set forth in claim 10, wherein said means for mounting said base plate to said barbecue grill is for mounting said base plate to legs of said barbecue grill.

13. The sideburner as set forth in claim 10, wherein said means for attaching said cover plate comprises a first clip on an edge of said cover plate for mating with a second clip on a corresponding edge of said base plate.

* * * * *